W. EDSON.
NUT LOCK.
APPLICATION FILED OCT. 20, 1914.
1,155,408.
Patented Oct. 5, 1915.
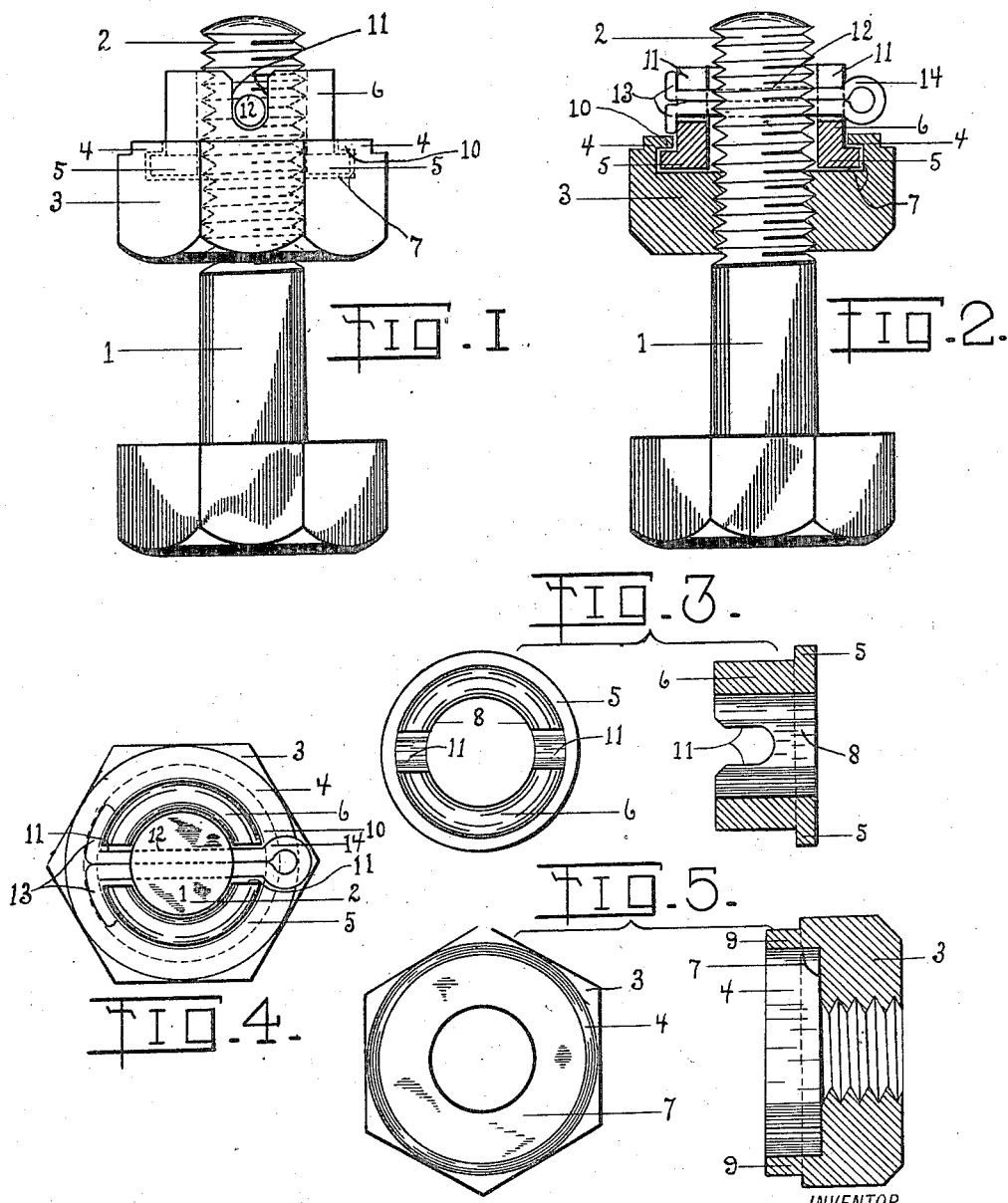
WITNESSES:
Sidney S. Sutton
John J. Callahan
INVENTOR
William Edson

# UNITED STATES PATENT OFFICE.

WILLIAM EDSON, OF NEW YORK, N. Y.

NUT-LOCK.

1,155,408.	Specification of Letters Patent.	Patented Oct. 5, 1915.

Application filed October 20, 1914. Serial No. 867,606.

*To all whom it may concern:*

Be it known that I, WILLIAM EDSON, citizen of the United States, and resident of the city of New York, in the county of New York and State of New York, have invented certain new and useful Improvements in Nut-Locks, of which the following is a specification.

This invention relates to the class of lock nuts.

Heretofore the utility of nut locks of the different castellated or split pin receiving types have been questioned by reason of the difficulty and length of time required to aline the apertures in the nut with the aperture in the screw threaded portion of a bolt, prior to the introduction of a split pin through said apertures, and it is my object to overcome this difficulty and provide means whereby an apertured split pin receiving member may be rotated with respect to a nut which has been fastened to a screw bolt, to position the apertures in said split pin receiving member in alinement with the aperture in the screw threaded portion of a bolt to permit the passage of a split pin through the apertures of said member and the bolt, thereby locking the nut on said bolt.

The present construction also forms means whereby the nut may be tightened on the bolt without the removal of the split pin.

With these and other objects in view, the invention consists in certain novel features of construction and combinations and arrangements of parts as will be more fully hereinafter described and pointed out in the claims.

In describing my invention in detail reference will be had to the accompanying drawings wherein like characters denote like or corresponding parts throughout the several views, and in which:—

Figure 1 is a side view of the invention as applied showing the apertured portion of the cylindrical rotatable member positioned to register with the aperture in the screw thread portion of the bolt. Fig. 2 is a similar view partly in section showing the locking element in service position through the nut and bolt. Fig. 3 is a longitudinal section of the rotatable locking element. Fig. 4 is a plan view of the nut lock complete. Fig. 5 is a detail in elevation and transverse section of the nut.

In the accompanying drawings illustrating the invention, the numeral 1 designates a bolt having a threaded end portion 2, and 3 the nut screwed upon the bolt which is provided on its face portion with an annular guide flange 4 circumferentially formed on said nut, the interior diameter of said flange is slightly greater than that of the annular swivel flange 5, of the rotatable locking member 6. The interior of the outer end of the nut 3 within the guide flange 4 is provided with a cupped bearing surface 7 which is of suitable diameter and depth to accommodate and allow the annular swivel flange portion 5, of the rotatable locking member 6, being rotated on said bearing surface 7 of the nut 3. The rotatable locking member 6, having a central bore 8 therein which is of greater diameter than that of the screw threaded portion 2 of the bolt 1, is rotatably mounted in the nut 3 and retained by said member by the downturning of the edge 9, of the annular guide flange 4, to form a circular abutting surface 10 which abuts against the upper face portion of the annular guide flange 5 and when the edge 9 is down turned may be so formed as to take up the excess longitudinal and lateral motion between the nut 3 and the rotatable locking member 6, the downturned edge 9, of the annular guide flange 4, is of sufficient diameter in construction to allow the cylindrical locking member 6 to revolve in the nut 3 without binding with said member.

In operation the aforesaid assemblage of the nut lock is tightly turned on the screw thread portion 2, of the bolt 1, thereby drawing the elements to which said nut and bolt are attached tightly together. The locking member 6, which is cylindrical in form and which is provided with a number of diametrically extending locking element receiving apertures 11, formed through the upper portion of the side wall of said member (shown at Figs. 3 and 4) is then manipulated in the cupped bearing surface 7, in the upper face portion of the nut 3, to position apertures 11, in the rotatable locking member 6, to register with the transverse aperture 12, in the screw threaded portion 2 of the bolt 1 to allow the insertion of a split or cotter pin locking element 14 through the alined apertures 11, of the rotatable locking member 6 and the transverse aperture 12, in the bolt 1, thereby locking the nut assemblage on the bolt 1, the ends 13 of the split or cotter pin locking element 14 are bent outwardly from the body portion of said locking element 14 (shown at Fig. 4) to retain said locking element therein, the apertured nut and bolt and thus effectually lock the rotatable locking member 6 from displacement and likewise effectually prevent retrograde movement of the nut on the aforesaid bolt.

It will be noted that the nut 3, is screwed home on the bolt and when in this position the locking member 6, is turned to bring the apertures 11 therein in line with the opening 12, of the threaded end of the bolt 1, and this permits the insertion of the split pin 14, to effect the positive and reliable locking of the nut upon the bolt.

One of the most important features of my nut lock resides in the interlocking connection between the nut and the locking member, which permits of the nut being screwed tight and the bringing of the locking member and pin into the exact position to lock the nut at the desired place under all conditions.

From the foregoing description taken in connection with the accompanying drawings, it will be seen that I have provided an extremely simple and efficient nut lock, which is adapted for use in the construction of machinery whereby the cotter pin can be quickly and easily entered in the apertured portion of a nut lock and the aperture in the bolt to prevent the nut from loosening on the bolt.

It is to be understood that while I have shown and described the preferred embodiment of my invention, I do not wish to be limited to this exact construction, combination and arrangement of parts, but may make such changes as will fall within the spirit and scope of the invention as defined by the appended claims.

Having thus described my invention, I claim as new and desire to secure by Letters Patent:

1. In a nut lock, the combination with a bolt having a transverse opening in the screw thread portion thereof, a main body portion or nut screwed on said bolt, a hollow cylindrical locking element rotatably mounted in said member and having diametrical disposed openings adapted to be revolved to register with the transverse opening in the screw thread portion of said bolt to allow the insertion of a locking element through said openings; said nut and locking element having interlocking means to retain them together.

2. A nut lock comprising a nut or body portion provided with a threaded bore and a circumferentially flanged rim encompassing said bore communicating and coaxial therewith, a hollow locking element having a flanged part at one end of greater diameter than the body portion, and diametrical locking element receiving apertures carried in the opposite end thereof, said locking element rotatably mounted at its flanged end on the nut or main body portion within the circumferentially flanged rim, and adapted to be turned whereby the diametrical apertures may be brought into registration with the transverse aperture of a bolt, and means adapted to prevent the separation of one member relatively to the other.

3. A nut lock, consisting of a bolt having a transverse opening, a nut on said bolt, a rotatable locking member mounted in and having flanged, interlocking engagement with said nut, and means having engagement with the opening of said bolt and locking member for locking the nut upon the bolt.

In testimony whereof I have signed my name to this specification in the presence of two subscribing witnesses.

WILLIAM EDSON.

Witnesses:
GUSTAV WOLF,
THOMAS ROBINSON.

Copies of this patent may be obtained for five cents each, by addressing the "Commissioner of Patents, Washington, D. C."